May 24, 1955  C. HOOK  2,708,894
HYDROFOIL CRAFT HAVING FORWARDLY EXTENDING WATER
ENGAGING AND HYDROFOIL MOVING MEANS
Filed March 6, 1952  4 Sheets-Sheet 1

INVENTOR
CHRISTOPHER HOOK

BY *Richards & Geier*
ATTORNEYS

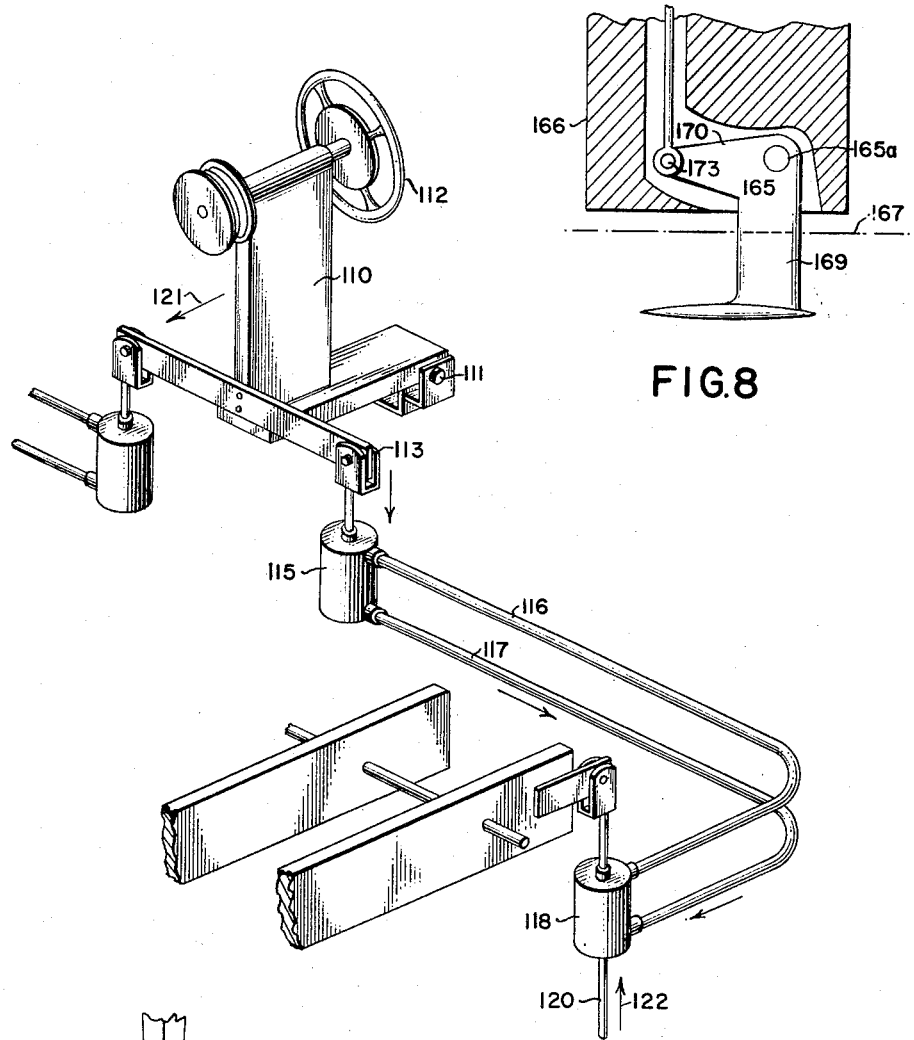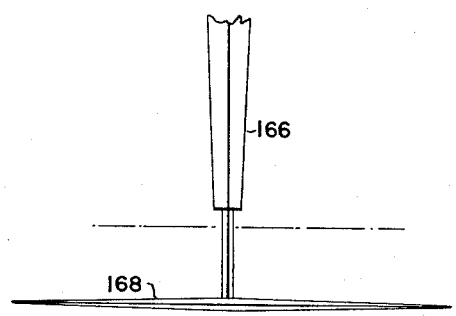

May 24, 1955 C. HOOK 2,708,894
HYDROFOIL CRAFT HAVING FORWARDLY EXTENDING WATER
ENGAGING AND HYDROFOIL MOVING MEANS
Filed March 6, 1952 4 Sheets-Sheet 3

INVENTOR
CHRISTOPHER HOOK

BY *Richards & Geier*
ATTORNEYS

May 24, 1955

C. HOOK 2,708,894

HYDROFOIL CRAFT HAVING FORWARDLY EXTENDING WATER ENGAGING AND HYDROFOIL MOVING MEANS

Filed March 6, 1952

INVENTOR

CHRISTOPHER HOOK

BY Richards & Geier

ATTORNEYS ent Office 2,708,894
Patented May 24, 1955

2,708,894

HYDROFOIL CRAFT HAVING FORWARDLY EXTENDING WATER ENGAGING AND HYDROFOIL MOVING MEANS

Christopher Hook, Biscayne Key, Dade County, Fla., assignor of twenty-five per cent to Calvert P. Holt, Greenwich, Conn.

Application March 6, 1952, Serial No. 275,124

11 Claims. (Cl. 114—66.5)

This invention relates to craft of the hydroplane or hydrofoil type.

My United States Patent #2,387,907 describes high speed craft capable of traveling on or above the surface of water and provided with submerged supporting foils which are inclined at a suitable angle of incidence so that, at a predetermined speed, the craft is supported above its normal floating position, or at a distance above the surface of the water, or is stabilized, owing to the water pressure or lift exerted upon the foils. The angle of incidence is automatically controlled by means of control jockeys or floats which skim along the surface of the water. The automatic control is such that the distance of the craft above its normal floating position or above the surface of the water remains substantially constant so long as its speed does not fall below a predetermined minimum. These supporting fins or foils act in a manner similar to the wings of an aircraft except that their medium of support is water as against air in the case of an aircraft.

An object of the present invention is to improve the construction of hydrofoil boats of this type.

Another object of the present invention is to construct a hydrofoil boat of the described type of large size and dimensions and capable of carrying a substantial load.

Yet another object is to improve construction of hydrofoil boats by taking the increasing forces into account which are exerted upon boats of large size.

A further object is to provide adequate banking means for hydrofoil boats.

A still further object is to provide adequate damping means between the jockey arms and the foils so as to avoid excessive stresses upon the hydrofoils and hull structure.

A still further object is to compensate for the excessive dynamic action of water waves exerted upon arms of large size.

A further object is to provide means exerting a limited corrective control over the foil incidence so as to enable the pilot to govern the height of travel of the craft above the water surface, without, however, assuming complete control of the automatic incidence control system.

A further object is to provide damping for the jockey arms which is sufficient to compensate for forces capable of being exerted upon the jockey arms in the event of large waves or when the craft runs into the wash of another boat.

A further object is the provision of a hydrofoil boat wherein the skimming jockey is partially or totally eliminated and is replaced by power drive for the foils and jockey.

Still another object is to improve the efficiency of boats of the described type and to improve means of beaching or hauling the craft out of water.

Still another object of the present invention is to provide a hydrofoil craft which is of amphibious type and is capable of use for military purposes or the like.

Other objects of the present invention will become apparent in the course of the following specification.

In realizing the objects of the present invention it was found desirable to construct small craft as well as a large hydrofoil boat wherein the skimming floats are replaced by trigger control capable of operating a mechanism which will actuate the foils. The boat is also provided with a banking control capable of operating from the pilot's seat and somewhat similar to the control now being used in aircraft. According to the present invention the manipulation of a single column is effective to govern the height of travel over the water, to reduce incidence to assist take-off from the water, and by selective manipulation to bank the craft on turning. According to the present invention the foil-carrying hydropeds are made in halves which are interconnected by hinges so that the hydropeds may be conveniently collapsed when it is desired to beach the craft or to haul it out of the water. According to one modification of the inventive idea the foldable hydropeds may be connected with wheels so as to make the craft imphibious. In another form of the same general principle the same hydroped carries both wheel and hydrofoil and is pivoted near its center in such a way as to have the foil below and the wheel above or vice versa.

According to another modification of the inventive idea the trigger control is combined with a float which skims along the water surface so as to relieve excessive damping forces on the jockey arms. Furthermore incidence control may be effected by other means, for example by means responsive to the pressure of flowing water.

The invention will appear more clearly from the following detailed description when taken in connection with accompanying drawings showing, by way of example, preferred embodiments of the inventive idea.

In the drawings:

Figure 3 illustrates a modification of the inventive idea and is a diagram showing a hydraulic device for operating the banking means suitable for larger craft.

Figure 8 is a section through the main foil used upon the boat shown in Figures 6 and 7.

Figure 9 is a front view of the hydrofoil.

Figure 1:
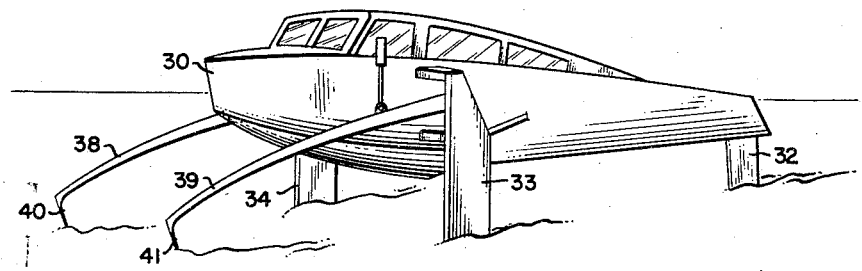
Figure 1 is a perspective view showing a large hydrofoil boat provided with trigger jockey control.
Figure 2:
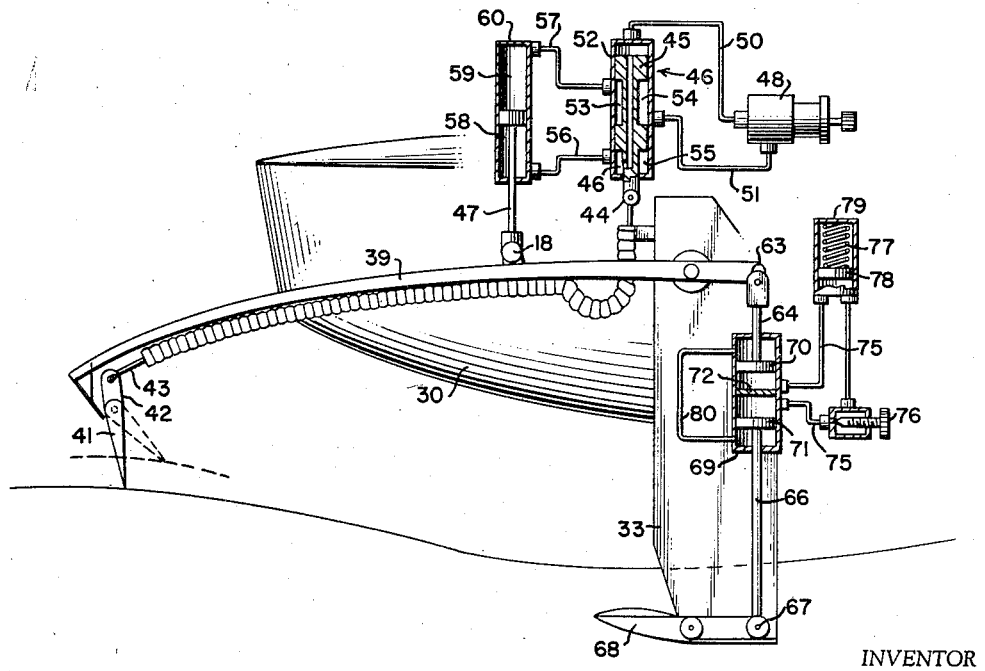
Figure 2 shows a part of the boat in side elevation, and illustrates the selector valve and actuator, as well as the hydraulic link between the foil-actuating means and the means actuated by the jockey arms.

Figures 1 and 2 of the drawings pertain to a hydrofoil boat provided with trigger control. As shown in Figure 1, the boat has a hull 30 of light construction covered, for example, with marine bonded plywood and divided into several water-tight compartments, hatches being provided for access to compartments. Two main spars run through the hull and carry hydropeds 33 and 34.

Any suitable motor is carried by the hull 30. A tail hydroped 32 is attached to the hull and carries the tail hydrofoil which is firmly connected with the hydroped 32. This construction is described in detail in my aforesaid United States Patent #2,387,907.

The craft is provided with jockey arms 38 and 39 having the shape of narrow elongated beams. The arms 38 and 39 carry triggers 40 and 41 adapted to be actuated by impact with water.

Figure 2 illustrates the trigger control in greater detail. Since the trigger 40 is in all respects similar to the trigger 41 and is used to actuate a similar mechanism, only the trigger 41 will be described in detail hereinafter.

As shown in Figure 2, a spring 42 is used to maintain the trigger 41 in the perpendicular position shown by full lines in Figure 2. A cable 43 connects the trigger 41 with the end of the piston 45, constituting a part of the valve 46. This valve is used to provide hydraulically operated means for moving the rod 47. As shown in Figure 2, the rod 47 is connected to the jockey arm 39 at 18 so that when the rod 47 will be lifted, the jockey arm 39 will be raised also. Alternatively, the actuator 60 may be incorporated in one piece with the arm 39 and become an integral part thereof.

The device for operating the rod 47 say at 19 is illustrated in Figure 2. This device includes a pump 48 which is of the usual rotary spherical type. The pump is connected with conduits 50 and 51 connected to the casing 52 of the valve 46. The piston 45 which is movable within the casing 46 has recesses 53 and 54 so that in the position illustrated the conduit 51 is connected with tube 56 through a chamber 55 provided below the piston 45. The conduit 51 is connected with a conduit 57 through the recess 54. The conduits 56 and 57 lead to chambers 58 and 59 of the actuating member 60. It is apparent that in the position illustrated the pump will be pumping liquid into the conduits 51 and 56 and will be withdrawing liquid from the conduits 50 and 57 so that pressure will be created in the chamber 58 and suction will be created in the chamber 59. Thus the device 60 will be raising the rod 47 vertically.

It is apparent that when as a result of the movement of the trigger 41 the piston 45 will move lower, the pressure conduit 51 will be connected, through a passage 62 provided in the recess 54, with the conduit 57 and through recess 54 tube 56 is connected to conduit 50. Then the operation of the member 60 will be reversed and the rod 47 will be lowered.

It is apparent that the device is illustrated diagrammatically in Figure 2 and is provided with pressure reservoirs and bypass valves which are not illustrated.

Figures 6, 7:
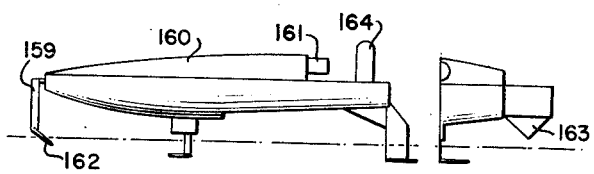
Figure 6 is a diagrammatic side view illustrating a craft operated by jet propulsion.
Figure 7 is a partial front view of the boat shown in Figure 6.

The opposite end 63 of the jockey arm 39 is connected with a rod 64. A hydraulic link connects the rod 64 with the rod 66 which is pivoted at 67 to one end of the hydrofoil 68 shown in Figure 7.

As shown in Figure 2, the rod 64 extends into a cylinder 69 and is connected with an upper piston 70. A lower piston 71 is connected to the rod 66. Partition 72 is located within the cylinder 69. The partition 72 by-passes the fluid to a restricted passage 75. The operative area of the passage 75 may be varied by the adjustable pin. A spring 77 engages a disk 78. The other end of the spring is enclosed in a cover 79. Chamber above piston 70 is connected to chamber below piston 71 by tube 80.

The operation of the hydraulic link is apparent from the above description. The operator may reduce the orifice 75 to any desired extent by adjusting the pin 76. Then any sudden movement of the upper piston 70, caused by the movement of the jockey arm 39, will be transmitted to the disk 78 and a spring 77 and will not be transmitted to the lower piston 71. In any event, the movement of the lower piston 70 can be considerably slower than the movements of the upper piston 71 by reason of a difference in size. Thus the hydraulic link has the function of reducing the extent of transmission of the movements of jockey arm 39 to the foil 68 while assuring that these movements will be transmitted to the desired extent.

The operation of the craft is apparent from the above descriptions. The craft may be driven by an ordinary power plant, the hull 30 of the craft will remain out of water in the course of the travel. The hydrofoils 68 will serve substantially as the wings of an airplane and will remain under the water, the angles of attack of the hydrofoils being varied automatically by the jockey action and within certain limits by the pilot, operating the control column 110.

Figure 3 illustrates a modification wherein hydraulic means are actuated by a control column 110 which is supported upon a universal joint 111 and carries a hand wheel 112. The control column 110 is connected at 113 with a piston which is located within a liquid-filled cylinder 115. Conduits 116 and 117 connect the cylinder 115 with a cylinder 118 which contains a piston. This piston is connected to a foil-actuating rod 120.

It is apparent that as the control column 110 is swung forward in the direction of the arrow 121, pressure in the conduit 117 will be increased, with the result that the rod 120 will be raised in the direction of the arrow 122. Thus this movement of the control column 110 will be communicated to the corresponding hydrofoil. The mechanism outlined in Fig. 2 may also be incorporated in cylinder 118 or added to this assembly by connection with rod 120.

Figure 4:
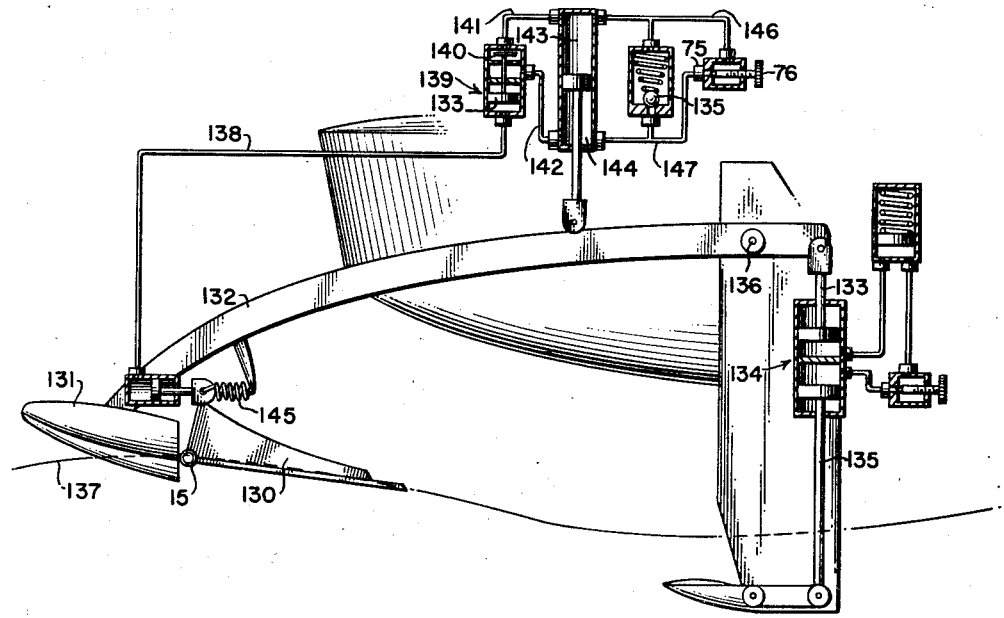
Figure 4 is a side view of a differently constructed hydrofoil boat wherein the trigger mechanism is combined with a float for damping pressure relief on a large craft, and is also a partial sectional view illustrating a hydraulic valve and actuator.

In the modification shown in Figure 4 a trigger heel 130 is combined with a float 131 and hinged thereto by hinge 15 and carried by one end of a jockey arm 132 the opposite end of which is connected with a rod 133. The rod 133 is connected to an hydraulic machine 134 which may be of the type illustrated in Figure 2 of the drawings. The other end of this machine may be connected to a rod 135 leading to a hydrofoil.

The jockey arm 132 is pivotally supported at 136 and is operated by the waves, the surface of which is indicated at 137. It is apparent, however, that the movements of the float 131 are transmitted to the foil-actuating rod 135 on a substantially reduced scale, due to the provision of the hydraulic machine 134.

The trigger or heel 130 is connected by a conduit 138 or other means to a relief valve 139. The valve 139 includes a cock 140 which is adapted to establish connection between conduits 141 and 142 or to interrupt connection between these conduits. The conduits 141 and 142 are connected to liquid-filled chambers 143 and 144.

The heel or trigger 130 may be maintained in a position at about 45° to the float 131 by a spring 145.

It is apparent that when the trigger or heel 130 extends at approximately 45° to the float 131, the valve 140 will be closed so that the hydraulically filled chambers 143 and 144 will tend to lock the jockey arm 132. Thus the jockey arm 132 will have little sensitivity to small waves and arm 132 will be carried by tip of heel 130 on the water.

In the position shown in Figure 4, the float 131 is directly supported by the wave which has raised the heel 130 and moved it to a position in which it extends substantially in the same plane as the float 131. In this position the valve 139 is open so that its parts assume the position shown in Figure 4 in which there is free connection between the chambers 143 and 144. Therefore, in this position damping pressure will be relieved, the arm 132 will be able to move up, depending upon the level 137 of the wave, and this movement of the arm 132 will be transmitted by the rods 133 and 135 to the foil.

It is thus apparent that in the construction shown in Figure 4 the pressure relief becomes operative only after the level of the water has reached a certain predetermined height.

Figure 5:
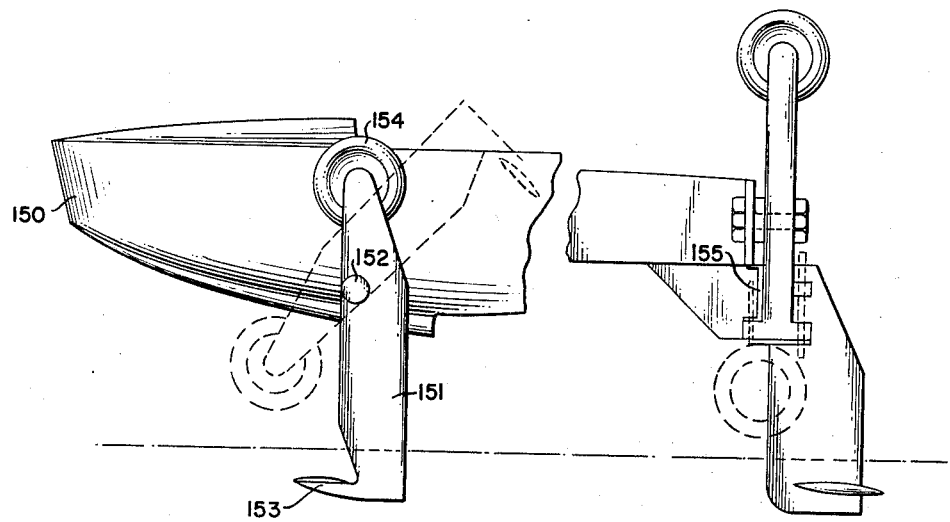
Figure 5 is a partial side view illustrating the forward and aft ends of a craft having revolving hydropeds provided with wheels which render the craft amphibious, the hydropeds being shown in different positions.
Figure 10:
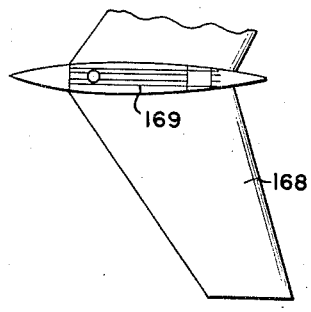
Figure 10 is a partial sectional view.

The construction illustrated in Figure 5 includes a body 150 carrying a hydroped 151 which is pivoted at 152 and which carries a hydrofoil 153. The opposite end of the hydroped 151 carries a wheel 154. It is apparent that the opposite side of the boat is provided with a similar arrangement.

When the boat is close to shore and in shallow waters the hydropeds may be actuated by any suitable means, not shown in the drawings, about the pivot 152 to withdraw the foils 153 from the water and to move the wheels 154 in their stead.

At the stern of the boat a tail foil and hydroped or rudder is shown; a lock 155 is provided. In this case the axis lies in a fore and aft direction and the assembly rotates about this through 180°. Then the wheels may be actuated by any suitable mechanism so as to move the boat on shore. It is thus apparent that Figure 5 illustrates a vehicle of an amphibious character which is most suitable for landing operations, for effecting communication between islands and for a variety of other purposes.

Figures 6 to 12 illustrate a boat 160 built for very high speed and operable, by way of example, by means of a jet propulsion motor 161. In this construction, in order to gain speed, the normal system of lateral stability provided by two jockeys is abandoned and is replaced by a vertical arm 159 which is vertically and slidably mounted in the bow of the boat and is provided with a trigger 162 of described construction. A deflector 164 is placed in the flow from the jet for lateral stability. Any suitable mechanism, not shown in the drawing, may be used to operate the deflector 164 so as to deflect a mass of air to one side or to the other. Control of this may be governed by gyroscopic or other automatic means. Fixed hydrofoils 163 are placed laterally on opposite sides of the boat 160 and serve as runners to improve lateral stability. In order to further increase the speed by a reduction of the water drag, the main axle of the hydrofoil 165 is placed in the upper portion of the central hydroped 166. The hydroped 166 will normally travel just on the water line so that the portion going through the water can be considerably reduced in section. As best shown in Figure 8, the hydroped 166 extends directly above the water line 167. The foil 168 which is located below the water line is carried by a narrow arm 169 of a two-arm lever 170 which is pivoted at 165a. The other arm 172 of the lever 170 is pivoted at 173 to a rod 174 which is actuated indirectly by the trigger 162 in a manner previously described using apparatus shown in Fig. 2. It is apparent that this construction will improve the structure by reducing water resistance to a considerable extent.

Figure 11:
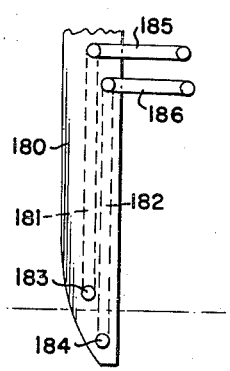
Figure 11 illustrates a somewhat different incidence control feeler for a mono-strut boat.

Figure 11 shows a strut 180 which may be slidably attached to the bow of the boat 160 and which may serve as a substitute for the strut 159.

The strut 180 carries two or more inner tubes 181 and 182. The tube 181 comes to the surface at 183 at one side of the strut. The tube 182 communicates with the outside at 184, the opening 184 being located below the opening 183. It is well known that an orifice on a cambered surface will register considerable negative pressures when passing through water at speed. This negative pressure can be utilized through any suitable connecting means 185 and 186 to actuate a valve of the type shown in Figure 2. The object of the two openings 183 and 184 is to provide two signals, one being an "urgent" signal and the other being a "normal" signal. The hydraulic mechanism will be set in such manner that the feeler will normally rise at a predetermined speed when water contact is made, and fall when water contact is broken, but if the boat should pass into rougher waters it might happen that this speed of rise will not be sufficient although the pilot will be provided with means for regulating the same. In these conditions the "urgent" signal would come into action and a second selector valve (not shown) would increase the flow of hydraulic liquid, or the pressure of same, thus increasing the speed at which the arm lifts and falls.

It is apparent that the described system of pressure-responsive members located vertically one above the other may be suitably varied by varying the shape or the construction of such elements.

Figure 12:
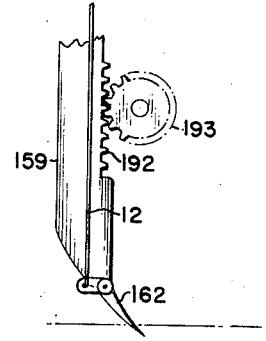
Figure 12 is a diagram illustrating incidence control feeler of a mono-strut boat.

Figure 12 illustrates a stream-lined strut 159 which carries a trigger 162. The trigger 162 is in communication with a machine such as that shown in Fig. 2 and which operates an arm to lift strut 159 when water contact is made by trigger 162 or to turn pinion 193 engaging rack 192. Movements of 159 are transmitted to a hydraulic machine, such as that shown in Fig. 2 to operate a rod 66 to change the incidence on the foil. In the example shown in Fig. 12, operation of the hydraulic machine under command of trigger 162 is made by cable 12; it is obvious, however, that many other similar methods of conveying the necessary signals may be utilized such as hydraulic, pneumatic, electric, magnetic, etc., without falling outside the scope of the present invention.

Figures 13, 14:
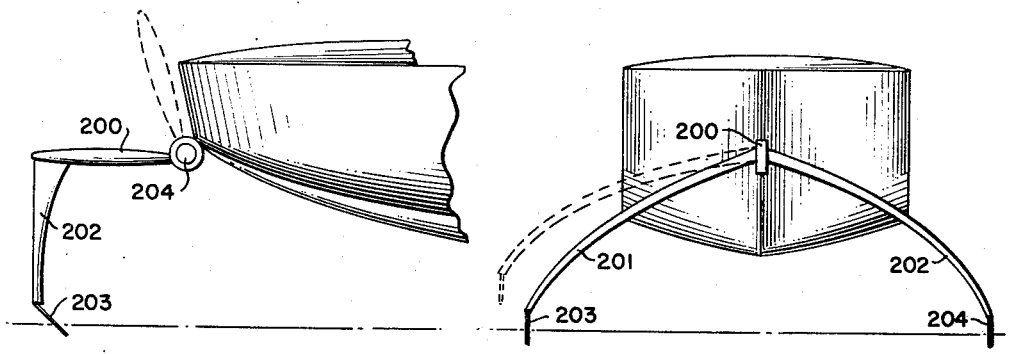
Figure 13 is a front view of a different jockey feeler mechanism.
Figure 14 is a side view of the mechanism shown in Figure 13.

Figures 13 and 14 show a construction wherein the jockey feeler mechanism has a form somewhat similar to that of a bow sprit of a sailing boat for the forward projection. The mechanism includes a forward projection spar 200 which is pivotally mounted at 204 to the hull so that it can be lifted up to a position shown by broken lines in Fig. 25 when the craft comes into dock. For the individual lateral control small arms 201 and 202 branch out sideways at the end of the spar 200, each arm being provided with its independent trigger 203 and 204. This form has the advantage that it is less vulnerable and the craft will occupy less space in port.

It is apparent that other variations and modifications may be made in the illustrated devices without exceeding the scope of the invention. All such variations and modifications are to be considered as being within the scope of the present invention.

What is claimed is:

1. In a craft having a hull and propulsion means therefor; a separate hydroped on each side of said hull, a separate stabilizing and supporting hydrofoil pivotally connected to each hydroped at the lower end thereof, jockey means forward of said hull and operable by engagement with water carrying the craft, a hydraulic link connected to said hydrofoils, means connecting said jockey means to said hydraulic link for moving said hydrofoils to vary the angle of incidence thereof, said means comprising two cylinders, pistons in said cylinders, means interconnecting said cylinders and forming a chamber and passages communicating with said chamber and said cylinders, means varying the operative area of at least one of said passages, and means for maintaining resilient hydraulic pressure in said chamber.

2. In a craft having a hull and propulsion means therefor; a separate hydroped on each side of said hull, a separate stabilizing and supporting hydrofoil pivotally connected to each hydroped at the lower end thereof, at least one heel swingable by impact with water carrying the craft, means swingably supporting said heel forward of said hull, and means transmitting the movements of said heel through cushioned hydraulic means to said hydrofoils to vary the angle of incidence thereof.

3. In a craft having a hull and propulsion means therefor; a separate hydroped on each side of said hull, a separate stabilizing and supporting hydrofoil pivotally connected to each hydroped at the lower end thereof, two jockey arms having rear ends and forward ends, means operatively connecting the rear end of each jockey arm with a separate hydrofoil, means pivotally supporting each jockey arm intermediate its ends in said hull, a separate float carried by the forward end of each jockey arm and adapted to engage water carrying the craft to swing the jockey arm, a separate heel carried by the forward end of each jockey arm adjacent to the float, a separate spring engaging each heel, the heels normally extending obliquely to the floats and being movable to positions in alinement with said floats by water pressure, and separate means damping and severely restraining each jockey arm while the heel carried thereby extends obliquely to its float.

4. A craft according to claim 3, wherein the separate means damping and severely restraining each jockey arm comprises a hydraulic circuit connected with the arm, and a heel-operated valve locking and releasing said hydraulic circuit.

5. In a craft having a hull and propulsion means therefor; a separate hydroped movably mounted on each side of said hull, a separate stabilizing and supporting hydrofoil pivotally connected to one end of the hydroped, a means moving said hydropeds in and out of vertical position, jockey means forward of said hull and operable by engagement with water carrying the craft, and hydraulic means connecting said jockey means with said hydrofoils for moving them to vary the angle of incidence thereof.

6. In a craft having a hull and propulsion means therefor; a hydroped carried by said hull, a stabilizing and supporting hydrofoil pivotally connected to said hydroped at the lower end thereof, a substantially vertical strut slidably carried by the bow of said hull, and means carried by said strut and operable by engagement with water carrying the craft to move said strut and hydrofoil.

7. A craft in accordance with claim 6, wherein the strut and hydrofoil moving means comprise separate openings located upon different levels adjacent the bottom of said strut, said strut having passages formed therein and connecting with openings adjacent the top of said strut, and motor means responsive to the position of the openings in the bottom of said strut for varying the angle of incidence of the hydrofoil.

8. In a craft having a hull and jet propulsion means therefor; a hydroped carried by said hull, a stabilizing and supporting hydrofoil pivotally connected to said hydroped at the lower end thereof, a substantially vertical strut slidably carried by the bow of the hull, a jet deflector carried by said hull adjacent said jet propulsion means, and means carried by said strut and operable by engagement with water carrying the craft to move said strut and hydrofoil.

9. In a craft having a hull and propulsion means therefor; a hydroped rotatably mounted on each side of said hull, a stabilizing and supporting hydrofoil pivotally connected to one end of each hydrofoil, a wheel rotatably mounted upon the other end of each hydrofoil, the hydropeds being adapted to move selectively the hydrofoils and the wheels into operative positions, jockey means forward of said hull and operable by engagement with water carrying the craft, and means connecting said jockey means with said hydrofoils for moving them to vary the angle of incidence thereof.

10. In a craft having a hull and propulsion means therefor; at least one hydroped connected with said hull, a stabilizing and supporting hydrofoil pivotally connected to one end of the hydrofoil, and jockey means connected with said hydrofoil and operable by engagement with water carrying the craft to vary the angle of incidence of the hydrofoil, said hydrofoil comprising a two-armed lever pivoted intermediate its ends, one of the arms of said lever consisting of a thin plate extending in the direction of the craft below the hydroped, and a transverse plate connected to the lower end of said one arm and extending perpendicularly thereto.

11. In a craft having a hull and propulsion means therefor; at least one hydroped connected with said hull, a stabilizing and supporting hydrofoil pivotally connected to one end of the hydroped, vertically movable jockey means operable by engagement with water carrying the craft, and means connecting said jockey means with said hydrofoils for moving them to vary the angle of incidence thereof, said hydrofoil-moving means being located upon different levels in said vertically movable jockey means.

References Cited in the file of this patent

UNITED STATES PATENTS

| | | |
|---|---|---|
| 2,387,907 | Hook | Oct. 30, 1945 |
| 2,491,744 | Link | Dec. 20, 1949 |
| 2,550,220 | Bussei | Apr. 24, 1951 |
| 2,576,716 | Gardiner | Nov. 27, 1951 |
| 2,603,179 | Gardiner | July 15, 1952 |

FOREIGN PATENTS

| | | |
|---|---|---|
| 420,825 | Italy | May 6, 1947 |
| 587,317 | Great Britain | Apr. 22, 1947 |
| 959,264 | France | Sept. 26, 1949 |